(12) United States Patent
Onuki (10) Patent No.: US 12,040,636 B2
(45) Date of Patent: Jul. 16, 2024

(54) CHARGING SYSTEM

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 422 days.

(21) Appl. No.: 17/399,114

(22) Filed: Aug. 11, 2021

(65) Prior Publication Data

US 2022/0085622 A1 Mar. 17, 2022

(30) Foreign Application Priority Data

Sep. 11, 2020 (JP) ................................. 2020-152753

(51) Int. Cl.
*H02J 7/00* (2006.01)
*H02J 7/02* (2016.01)
(Continued)

(52) U.S. Cl.
CPC ........ *H02J 7/0019* (2013.01); *H02J 7/00712* (2020.01); *H02J 7/02* (2013.01);
(Continued)

(58) Field of Classification Search
CPC ........ H02J 7/0019; H02J 7/00712; H02J 7/02; H02J 7/06; H02J 7/35; H02J 2207/20; H02J 2300/24; B60L 53/51; Y02E 10/56
(Continued)

(56) References Cited

U.S. PATENT DOCUMENTS 5,646,504 A 7/1997 Feldstein
5,726,551 A 3/1998 Miyazaki et al.
(Continued)

FOREIGN PATENT DOCUMENTS

CN 102684273 A * 9/2012 .......... H01M 10/441
CN 111264014 A * 6/2020 ................ B60L 3/00
(Continued)

OTHER PUBLICATIONS

Japanese Notice of Allowance for Japanese Patent Application No. 2020-152753 mailed Oct. 17, 2023.

*Primary Examiner* — Zixuan Zhou
(74) *Attorney, Agent, or Firm* — Amin, Turocy & Watson, LLP (57) ABSTRACT

A charging system is provided herein. The charging system includes an alternating current (AC) power source, opening/closing rectifying units composed of rectifying circuits and opening/closing circuits, and a control device. The rectifying circuits are connected to modules formed by dividing a battery into the modules. The rectifying circuits supply direct current (DC) electric power obtained by rectifying AC electric power supplied from the AC power source to the modules. The opening/closing circuits switch between connection and disconnection between the AC power source and each of the modules. The control device controls connection and disconnection of the opening/closing circuits in accordance with a state quantity of at least one of an output voltage of the AC power source and an input voltage of the rectifying circuits or a state quantity associated with at least one of the output voltage and the input voltage.

2 Claims, 10 Drawing Sheets

(51) Int. Cl.
   *H02J 7/06* (2006.01)
   *H02J 7/35* (2006.01)
   *B60L 53/51* (2019.01)
(52) U.S. Cl.
   CPC ............... *H02J 7/06* (2013.01); *H02J 7/35* (2013.01); *B60L 53/51* (2019.02); *H02J 2207/20* (2020.01); *H02J 2300/24* (2020.01); *Y02E 10/56* (2013.01)
(58) Field of Classification Search
   USPC ....................... 320/109, 116–119; 701/22
   See application file for complete search history.

(56) References Cited

U.S. PATENT DOCUMENTS

| | | |
|---|---|---|
| 2008/0211456 A1 | 9/2008 | Bolz et al. |
| 2014/0328101 A1 | 11/2014 | Sameshima et al. |

FOREIGN PATENT DOCUMENTS

| | | |
|---|---|---|
| JP | 02-123928 | 5/1990 |
| JP | 04-183230 | 6/1992 |
| JP | 09-117067 | 5/1997 |
| JP | 2009-124807 | 6/2009 |
| JP | 2011-067021 | 3/2011 |
| JP | 2013-115913 | 6/2013 |

\* cited by examiner

CHARGING SYSTEM

CROSS-REFERENCE TO RELATED APPLICATION

Priority is claimed on Japanese Patent Application No. 2020-152753, filed Sep. 11, 2020, the content of which is incorporated herein by reference.

BACKGROUND OF THE INVENTION

Field of the Invention

The present invention relates to a charging system.

Description of Related Art

In the related art, for example, a power supply device which supplies electric power to a power storage device including a plurality of battery cells connected in series is known (for example, refer to Japanese Unexamined Patent Application, First Publication No. 2011-67021). The power supply device includes a rectifying circuit connected to each of a plurality of modules constituting the power storage device, an alternating current (AC) electric circuit which sequentially connects between the rectifying circuits, and an AC generation circuit which applies an AC voltage to the AC electric circuit.

SUMMARY OF THE INVENTION

In the power supply device in the related art described above, when an output voltage range of an electric power source included in the AC generation circuit is restricted, if voltage conversion is performed using a power conversion circuit such as a direct current (DC)-DC converter, there is a concern concerning a decrease in efficiency of electric power supply. For example, when an output voltage of an electric power source such as solar cells is stepped down using the DC-DC converter to secure charging through the generated electric power at an optimum operation point of a maximum output for the electric power source whose output voltage is restricted due to a decrease in amount of solar radiation, there is a concern concerning a decrease in charging electric power due to a decrease in conversion efficiency.

An aspect of the present invention was made in consideration of such circumstances, and an object of the present invention is to provide a charging system capable of minimizing a decrease in charging efficiency.

In order to solve the above problems and achieve the above object, the present invention has adopted the following aspects.

(1) A charging system according to an aspect of the present invention is a charging system which charges a power storage device formed by connecting a plurality of power storage elements with electricity including: an alternating current (AC) power source; a plurality of rectifying units which are connected to a plurality of modules formed by dividing the power storage device into the plurality of modules and supply direct current (DC) electric power obtained by rectifying AC electric power supplied from the AC power source to the plurality of modules; a plurality of opening/closing units which switch between connection and disconnection between the AC power source and each of the plurality of modules; and a control device which controls connection and disconnection of the plurality of opening/closing units in accordance with a state quantity of at least one of an output voltage of the AC power source and an input voltage of the rectifying units or a state quantity associated with at least one of the output voltage and the input voltage.

(2) In the above aspect (1), the control device may set an upper limit number of the opening/closing units to be connected at the same time among the plurality of opening/closing units in accordance with the state quantity and sequentially switch and select the upper limit number of the opening/closing units to be connected from among the plurality of opening/closing units.

(3) In the above aspect (2), the control device may control a time of each connection state of the plurality of opening/closing units so that a charging state of each of the plurality of modules is the same.

According to the above aspect (1), when the charging of the plurality of modules is controlled in accordance with the state quantity of at least one of the output voltage of the AC power source and the input voltage of the rectifying units or the state quantity associated with at least one of the output voltage and the input voltage, it is possible to minimize a decrease in charging efficiency even when the output voltage of the AC power source is restricted. For example, it is possible to minimize the total amount of charging electric power supplied to the plurality of modules even when the output voltage of the AC power source is restricted and the output voltage cannot be lowered below a prescribed voltage. Since the total amount of charging electric power supplied to the plurality of modules can be minimized without lowering the output voltage of the AC power source, it is possible to prevent an operation in a region in which the efficiency of power conversion for stepping-up or stepping-down the output voltage of the AC power source is low and it is possible to minimize a conversion loss.

In the case of the above aspect (2), when the charging of the plurality of modules of the power storage device partially stops, the modules which are stopped are sequentially switched to uniformly charge the plurality of modules with electricity while minimizing a decrease in charging efficiency. Therefore, the charging state between the modules can be kept uniform.

In the case of the above aspect (3), when a connection state time is controlled in accordance with a connection time, a connection frequency, or the like of each of the opening/closing units, even when a difference in charging state occurs between the plurality of modules, it is possible to easily correct the difference in charging state.

DETAILED DESCRIPTION OF THE INVENTION

A charging system 10 according to an embodiment of the present invention will be described below with reference to the accompanying drawings.

Figure 1:
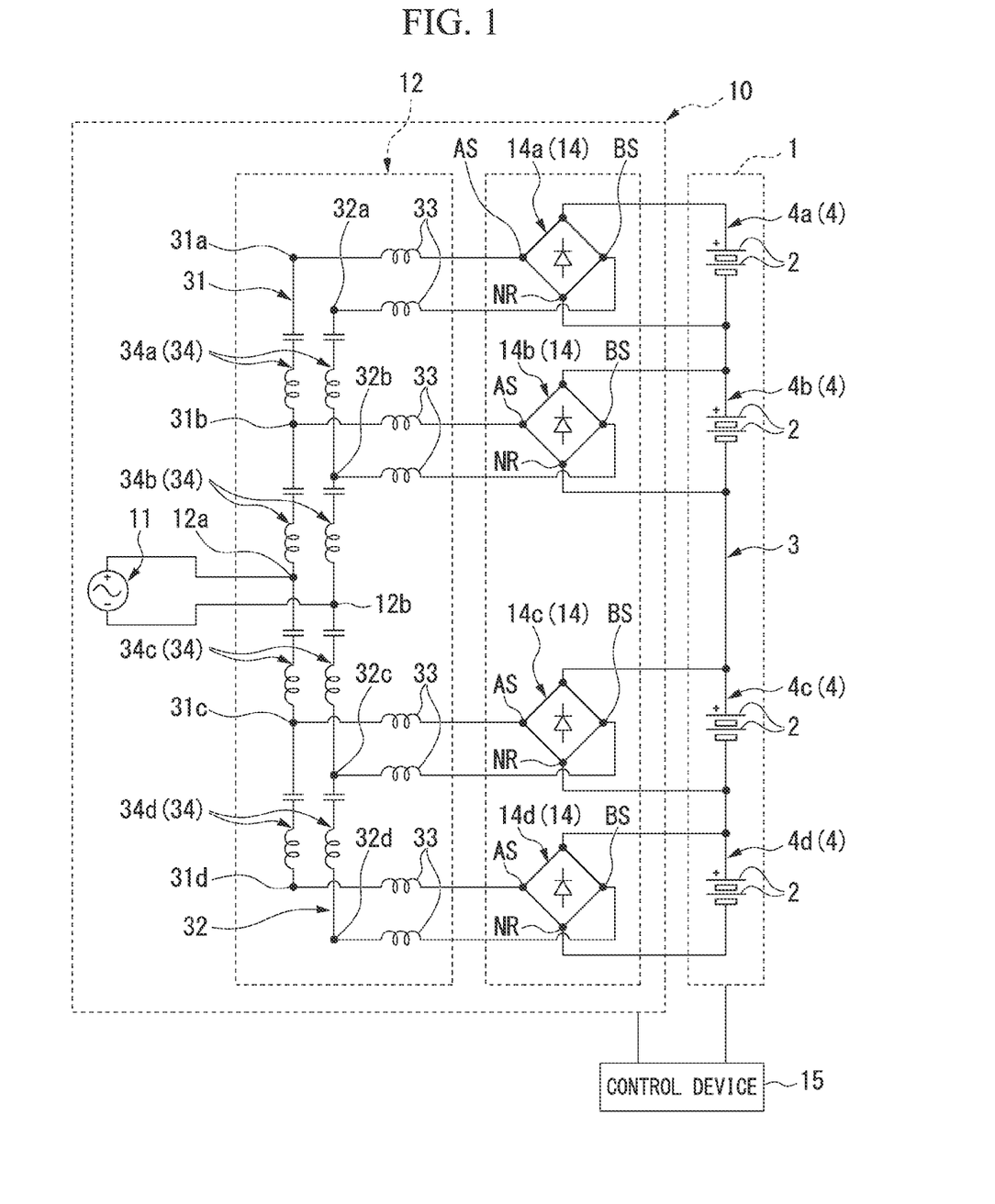
FIG. 1 is a diagram showing a constitution of a charging system in an embodiment of the present invention.

FIG. 1 is a diagram showing a constitution of the charging system 10 in the embodiment.

The charging system 10 according to the embodiment is installed in, for example, a vehicle such as an electric vehicle. The charging system 10 is connected to a power storage device installed in the vehicle. Electric vehicles are electric automobiles, hybrid vehicles, fuel cell vehicles, or the like. Electric automobiles are driven using batteries as power sources. Hybrid vehicles are driven using batteries and internal combustion engines as power sources. Fuel cell vehicles are driven using fuel cells as power sources.

As shown in FIG. 1, the power storage device connected to the charging system 10 is, for example, a high-voltage battery 1 which is a power source for the vehicle. The battery 1 includes a string 3 formed of a plurality of cells 2 connected in series and a positive electrode terminal and a negative electrode terminal at both ends of the string 3. The battery 1 includes a plurality of modules 4 formed by dividing the string 3 into a plurality of sub-strings in series. The plurality of modules 4 are, for example, a first module 4a, a second module 4b, a third module 4c, and a fourth module 4d formed by dividing the string 3 into four modules.

The charging system 10 includes an alternating current (AC) power source 11, an AC electric circuit 12, a plurality of opening/closing rectifying units 14, and a control device 15.

Figure 2:
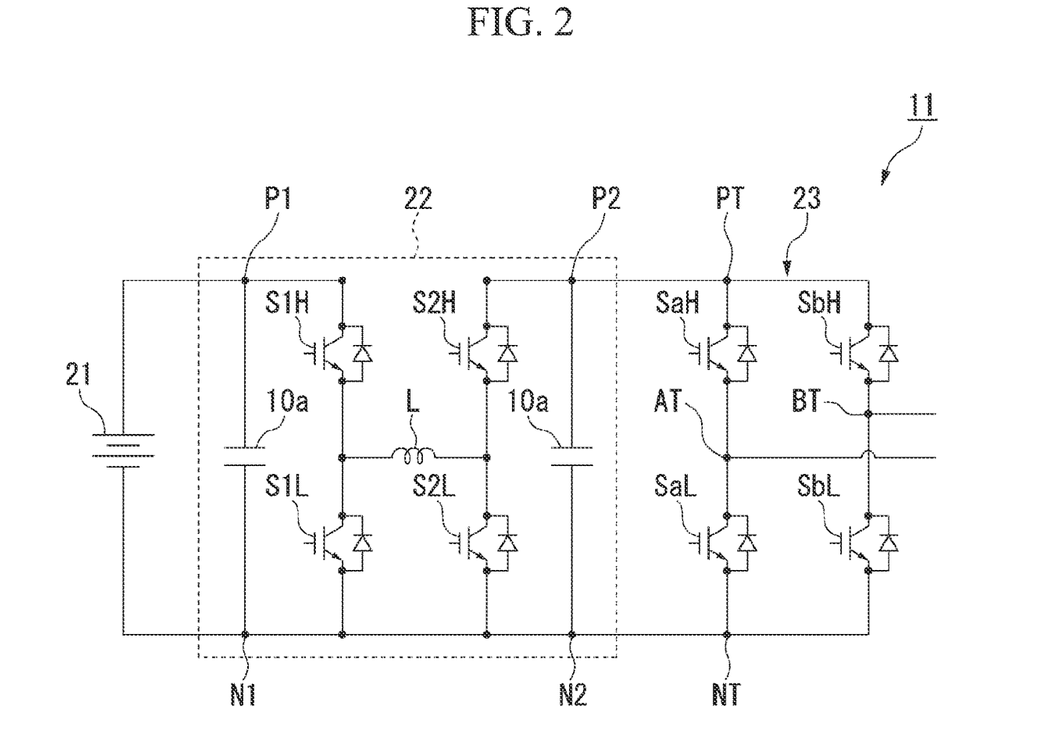
FIG. 2 is a diagram showing a constitution of an alternating current (AC) power source of the charging system in the embodiment of the present invention.
Figure 3:
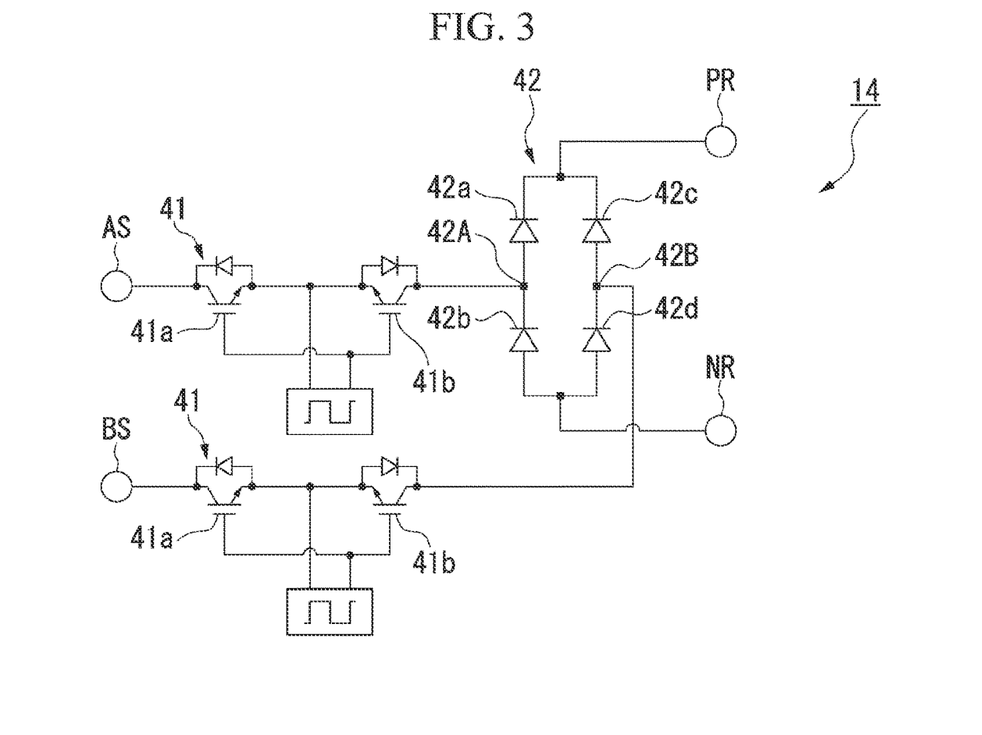
FIG. 3 is a diagram showing a constitution of a rectifying circuit and an opening/closing circuit of the charging system in the embodiment of the present invention.

FIG. 2 is a diagram showing a constitution of an AC power source 11 of the charging system 10 in the embodiment. FIG. 3 is a diagram showing a constitution of an opening/closing circuit 41 and a rectifying circuit 42 of the charging system 10 in the embodiment.

As shown in FIG. 2, the AC power source 11 includes a direct current (DC) power source 21, a first power conversion unit 22, and a second power conversion unit 23.

The DC power source 21 is, for example, a solar cell or the like.

The first power conversion unit 22 includes, for example, a DC-DC converter which performs two electric power conversions such as stepping-up and stepping-down. The first power conversion unit 22 includes a first positive electrode terminal P1 and a first negative electrode terminal N1 and a second positive electrode terminal P2 and a second negative electrode terminal N2.

The first positive electrode terminal P1 and the first negative electrode terminal N1 of the first power conversion unit 22 are connected to a positive electrode terminal DP and a negative electrode terminal DN of the DC power source 21. The second positive electrode terminal P2 and the second negative electrode terminal N2 of the first power conversion unit 22 are connected to a positive electrode terminal PT and a negative electrode terminal NT of the second power conversion unit 23.

The first power conversion unit 22 includes, for example, a switching element and a rectifying element of a pair of low-side arm and high-side arm having two phases and a reactor. The switching element is a transistor such as an insulated gate bipolar transistor (IGBT) or a metal oxide semi-conductor field effect transistor (MOSFET). The rectifying element is a diode connected in parallel to each transistor. The reactor is a choke coil L.

The first power conversion unit 22 includes a pair of high-side arm and low-side arm first-phase transistors S1H and S1L having a first phase and a pair of high-side arm and low-side arm second-phase transistors S2H and S2L having a second phase. The first power conversion unit 22 includes a freewheeling diode which is connected between a collector and an emitter of each transistor S1H, S1L, S2H, or S2L in a forward direction from the emitter toward the collector.

The collector of the high-side arm first-phase transistor S1H is connected to the first positive electrode terminal P1. The collector of the high-side arm second-phase transistor S2H is connected to the second positive electrode terminal P2. The emitters of the low-side arm first-phase transistor S1L and the low-side arm second-phase transistor S2L are connected to the first negative electrode terminal N1 and the second negative electrode terminal N2. The emitter of the high-side arm first-phase transistor S1H and the collector of the low-side arm first-phase transistor S1L are connected to a first end of both ends of the choke coil L. The emitter of the high-side arm second-phase transistor S2H and the collector of the low-side arm second-phase transistor S2L are connected to a second end of both ends of the choke coil L.

The first power conversion unit 22 includes a first smoothing capacitor C1 connected between the first positive electrode terminal P1 and the first negative electrode terminal N1 and a second smoothing capacitor C2 connected between the second positive electrode terminal P2 and the second negative electrode terminal N2. The first smoothing capacitor C1 and the second smoothing capacitor C2 smooth voltage fluctuations generated due to an on/off switching operation of each transistor S1H, S1L, S2H, and S2L.

The first power conversion unit 22 switches between turning-on (making electrically-conducting)/turning-off (cutting-off) of each transistor S1H, S1L, S2H, and S2L on the basis of a gate signal which is a switching command input to a gate of each transistor S1H, S1L, S2H, and S2L.

The first power conversion unit 22 steps up electric power input from the DC power source 21 to the first positive electrode terminal P1 and the first negative electrode terminal N1 at the time of stepping-up and outputs the stepped-up electric power from the second positive electrode terminal P2 and the second negative electrode terminal N2. The first power conversion unit 22 keeps the high-side arm first-phase transistor S1H turned-on (electrically-conducting) and the low-side arm first-phase transistor S1L turned-off (cut-off) at the time of stepping-up.

The first power conversion unit 22 stores magnetic energy through DC excitation of the reactor (the choke coil L) when the high-side arm second-phase transistor S2H is turned off (cut off) and the low-side arm second-phase transistor S2L is turned on (electrically conducting). The first power conversion unit 22 generates a voltage higher than that of the first positive electrode terminal P1 and the first negative electrode terminal N1 on the second positive electrode terminal P2 and the second negative electrode terminal N2 using the induced voltage generated through the magnetic energy of the reactor (the choke coil L) and a voltage applied to the first positive electrode terminal P1 and the first negative electrode terminal N1 which overlap when the high-side arm second-phase transistor S2H is turned on (electrically conducting) and the low-side arm second-phase transistor S2L is turned off (cut off).

The first power conversion unit 22 steps down electric power input from the first positive electrode terminal P1 and the first negative electrode terminal N1 at the time of stepping-down and outputs the stepped-down electric power from the second positive electrode terminal P2 and the second negative electrode terminal N2. The first power conversion unit 22 keeps the high-side arm second-phase transistor S2H turned-on (electrically-conducting) and the low-side arm second-phase transistor S2L turned-off (cut-off) at the time of stepping-up.

The first power conversion unit 22 stores magnetic energy through DC excitation of the reactor (the choke coil L) when the high-side arm first-phase transistor S1H is turned on (electrically conducting) and the low-side arm first-phase transistor S1L is turned off (cut off). The first power conversion unit 22 steps down an induced voltage generated using the magnetic energy of the reactor (the choke coil L) when the high-side arm first-phase transistor S1H is turned off (cut off) and the low-side arm first-phase transistor S1L is turned on (electrically conducting) and generates a voltage lower than that of the first positive electrode terminal P1 and the first negative electrode terminal N1 on the second positive electrode terminal P2 and the second negative electrode terminal N2.

The second power conversion unit 23 includes, for example, an inverter which converts DC electric power input from the first power conversion unit 22 into AC electric power and outputs the AC electric power to the AC electric circuit 12.

The second power conversion unit 23 includes, for example, a bridge circuit formed of a plurality of switching elements and rectifying elements which are bridge-connected and have two phases such as an A phase and a B phase. The switching element is a transistor such as an IGBT or a MOSFET. The rectifying element is a diode connected to each transistor in parallel.

The second power conversion unit 23 includes a pair of high-side arm and low-side arm A-phase transistors SaH and SaL having an A phase and a pair of high-side arm and low-side arm B-phase transistors SbH and SbL having a B phase. The second power conversion unit 23 includes a freewheeling diode connected between a collector and an emitter of each transistor SaH, SaL, SbH, and SbL in a forward direction from the emitter toward the collector.

The collectors of the high-side arm A-phase transistor SaH and the high-side arm B-phase transistor SbH are connected to the positive electrode terminal PT. The emitters of the low-side A-phase transistor SaL and the low-side arm B-phase transistor SbL are connected to the negative electrode terminal NT. The emitter of the high-side arm A-phase transistor SaH and the collector of the low-side arm A-phase transistor SaL are connected to an A-phase terminal AT. The emitter of the high-side arm B-phase transistor SbH and the collector of the low-side arm B-phase transistor SbL are connected to a B-phase terminal BT.

The second power conversion unit 23 switches between turning-on (electrically-conducting)/turning-off (cutting-off) of the pair of transistors having each phase on the basis of a gate signal which is switching command input to the gate of each transistor SaH, SaL, SbH, and SbL. The second power conversion unit 23 converts DC electric power input from the positive electrode terminal PT and the negative electrode terminal NT into single-phase AC electric power and outputs the single-phase AC electric power from the A-phase terminal AT and the B-phase terminal BT. The A-phase terminal AT of the second power conversion unit 23 is connected to an A-phase terminal 12a of the AC electric circuit 12 and the B-phase terminal BT of the second power conversion unit 23 is connected to a B-phase terminal 12b of the AC electric circuit 12.

The AC power source 11 supplies the same current (electric power) to each of the modules 4 of the battery 1, for example, when an alternating current having a frequency close to a resonance frequency of circuits of a plurality of LC rows 34 and a plurality of inductors 33 of the AC electric circuit 12 which will be described later is generated.

As shown in FIG. 1, the AC electric circuit 12 is connected to the AC power source 11 and the plurality of opening/closing rectifying units 14. The AC electric circuit 12 includes, for example, an A-phase electric circuit 31, a B-phase electric circuit 32, and a plurality of inductors 33 connected between each of the A-phase electric circuit 31 and the B-phase electric circuit 32 and the plurality of opening/closing rectifying units 14.

Each of the A-phase electric circuit 31 and the B-phase electric circuit 32 includes a plurality of LC rows 34 connected in series. Each of the LC rows 34 includes a capacitor and an inductor connected in series. The number of the plurality of LC rows 34 in each of the A-phase electric circuit 31 and the B-phase electric circuit 32 is the same as the number of the plurality of opening/closing rectifying units 14 (that is, the plurality of modules 4). For example, the plurality of LC rows 34 are four LC rows 34 which has the same number as the four opening/closing rectifying units 14. The four LC rows 34 are a first LC row 34a, a second LC row 34b, a third LC row 34c, and a fourth LC row 34d which are sequentially connected in series. A combination of the capacitance of each capacitor in the plurality of LC rows 34 and the inductance of the inductor may be different combinations among the plurality of LC rows 34.

The number of the plurality of inductors 33 is the number obtained by providing two indicators 33 for each of the plurality of opening/closing rectifying units 14 (that is, the plurality of modules 4) which will be described later. For example, the plurality of inductors 33 are eight inductors 33 obtained by providing two inductors 33 for each of the four opening/closing rectifying units 14. As will be described later, the four opening/closing rectifying units 14 are a first opening/closing rectifying unit 14a, a second opening/closing rectifying unit 14b, a third opening/closing rectifying unit 14c, and a fourth opening/closing rectifying unit 14d. The inductances of the plurality of inductors 33 may have values different from each other among the plurality of inductors 33.

A first end 31a of both ends of the A-phase electric circuit 31 is connected to an A-phase terminal AS of the first opening/closing rectifying unit 14a via one of the inductors 33. A first end 32a of both ends of the B-phase electric circuit 32 is connected to a B-phase terminal BS of the first opening/closing rectifying unit 14a via one of the inductors 33.

A connection point 31b between the first LC row 34a and the second LC row 34b of the A-phase electric circuit 31 is connected to the A-phase terminal AS of the second opening/closing rectifying unit 14b via one of the inductors 33. A connection point 32b between the first LC row 34a and the second LC row 34b of the B-phase electric circuit 32 is connected to the B-phase terminal BS of the second opening/closing rectifying unit 14b via one of the inductors 33.

A connection point between the second LC row 34b and the third LC row 34c of the A-phase electric circuit 31 is the A-phase terminal 12a of the AC electric circuit 12. A connection point between the second LC row 34b and the third LC row 34c of the B-phase electric circuit 32 is the B-phase terminal 12b of the AC electric circuit 12.

A connection point 31c between the third LC row 34c and the fourth LC row 34d of the A-phase electric circuit 31 is connected to the A-phase terminal AS of the third opening/closing rectifying unit 14c via one of the inductors 33. A connection point 32c between the third LC row 34c and the fourth LC row 34d of the B-phase electric circuit 32 is connected to the B-phase terminal BS of the third opening/closing rectifying unit 14c via one of the inductors 33.

A second end 31d of both ends of the A-phase electric circuit 31 is connected to the A-phase terminal AS of the fourth opening/closing rectifying unit 14d via one of the inductors 33. A second end 32d of both ends of the B-phase electric circuit 32 is connected to the B-phase terminal BS of the fourth opening/closing rectifying unit 14d via one of the inductors 33.

The AC electric circuit 12 has, for example, the same resonance frequency for each of the modules 4 when a product of a combined capacitance and a combined inductance of the plurality of LC rows 34 and the plurality of inductors 33 for each of the modules 4 of the battery 1 is set to be the same and supplies the same current (electric power).

The plurality of opening/closing rectifying units 14 are the first opening/closing rectifying unit 14a, the second opening/closing rectifying unit 14b, the third opening/closing rectifying unit 14c, and the fourth opening/closing rectifying unit 14d which are sequentially connected to the first module 4a, the second module 4b, the third module 4c, and the fourth module 4d.

As shown in FIG. 3, each of the plurality of opening/closing rectifying units 14 includes two opening/closing circuits 41 and a rectifying circuit 42.

The two opening/closing circuits 41 are connected between the A-phase terminal AS and the B-phase terminal BS of the opening/closing rectifying unit 14 and the rectifying circuit 42. Each of the two opening/closing circuits 41 includes, for example, a switch formed of a switching element and a rectifying element. The switching element is a transistor such as an IGBT or a MOSFET. The rectifying element is a diode connected in parallel to each transistor. The opening/closing circuit 41 is, for example, a bidirectional switch including two sets of switching elements and rectifying elements.

The opening/closing circuit 41 includes a first transistor 41a and a second transistor 41b connected in anti-series and a freewheeling diode connected between a collector and an emitter of each transistor 41a or 41b in a forward direction from the emitter toward the collector.

The emitters of the first transistor 41a and the second transistor 41b are connected to each other. The collector of the first transistor 41a is connected to the A-phase terminal AS (or the B-phase terminal BS). The collector of the second transistor 41b is connected to a first AC terminal 42A (or a second AC terminal 42B) of the rectifying circuit 42.

The opening/closing circuit 41 switches the turning-on (the electrically-conducting)/turning-off (cutting-off) of the first transistor 41a and the second transistor 41b on the basis of a gate signal which is the same switching command input to each gate of the first transistor 41a and the second transistor 41b. The opening/closing circuit 41 switches connection and disconnection between the AC electric circuit 12 and the rectifying circuit 42 by turning on (electrically conducting)/turning off (cutting off) the first transistor 41a and the second transistor 41b.

The rectifying circuit 42 is connected between the two opening/closing circuits 41 and a positive electrode terminal PR and a negative electrode terminal NR of each of the opening/closing rectifying units 14. The rectifying circuit 42 includes, for example, a bridge circuit formed of a plurality of diodes bridge-connected using two rows such as a first row and a second row.

The rectifying circuit 42 is, for example, a full-wave rectifying circuit. The rectifying circuit 42 includes a first diode 42a and a second diode 42b connected using the first row in the forward direction and a third diode 42c and a fourth diode 42d connected using the second row in the forward direction.

An anode of the first diode 42a and a cathode of the second diode 42b are connected to the first AC terminal 42A. An anode of the third diode 42c and a cathode of the fourth diode 42d are connected to the second AC terminal 42B.

Cathodes of the first diode 42a and the third diode 42c are connected to the positive electrode terminal PR. Anodes of the second diode 42b and the fourth diode 42d are connected to the negative electrode terminal NR. The positive electrode terminal PR and the negative electrode terminal NR of the rectifying circuit 42 are connected to a positive electrode end and a negative electrode end of a corresponding module 4 in the battery 1.

The rectifying circuit 42 full-wave-rectifies AC electric power input from the first AC terminal 42A and the second AC terminal 42B and outputs the rectified DC electric power from the positive electrode terminal PR and the negative electrode terminal NR.

As shown in FIG. 1, the control device 15 controls an operation of the charging system 10. For example, a software function unit which functions using a prescribed program executed by means of the control device 15 and a process such as a central processing unit (CPU) is exemplified. The software function unit includes a processor such as a CPU, a read only memory (ROM) for storing a program, a random access memory (RAM) for temporarily storing data, and an electronic control unit (ECU) including an electric circuit such as a timer. At least a part of the control device 15 may be an integrated circuit such as large scale integration (LSI).

The control device 15 sets a timing at which each switching element of each of the AC power source 11 and the plurality of opening/closing rectifying units 14 is driven to be turned on (electrically conducted)/turned off (cut off) and actually generates a gate signal for driving each switching element so that the switching element is turned on (electrically conducted)/turned off (cut off).

The control device 15 controls connection and disconnection of the plurality of opening/closing rectifying units 14 in accordance with a state quantity of at least one of an output voltage of the AC power source 11 and an input voltage of the opening/closing rectifying unit 14 or a state quantity associated with at least one of the output voltage and the input voltage.

Figure 4:
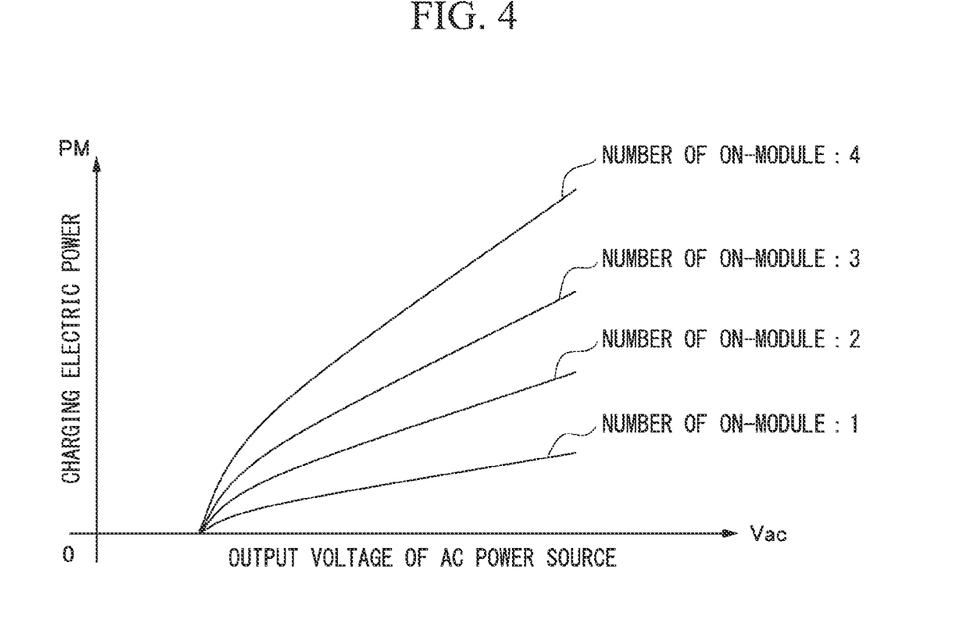
FIG. 4 is a diagram showing an example of a correspondence relationship between an output voltage of the AC power source, charging electric power of a battery, and the number of modules corresponding to an opening/closing rectifying unit in a connection state in the charging system in the embodiment of the present invention.
Figure 5:
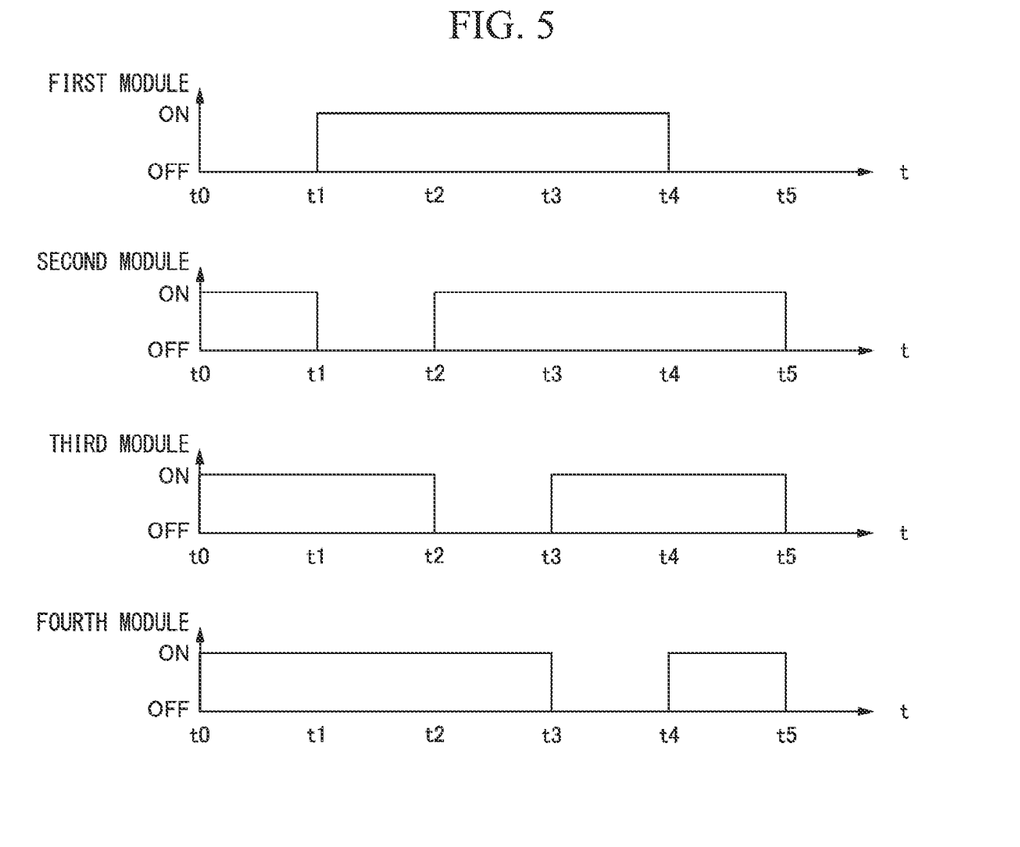
FIG. 5 is a diagram showing a first example of an on/off pattern of an opening/closing circuit corresponding to each of first to fourth modules in the charging system in the embodiment of the present invention.
Figure 6:
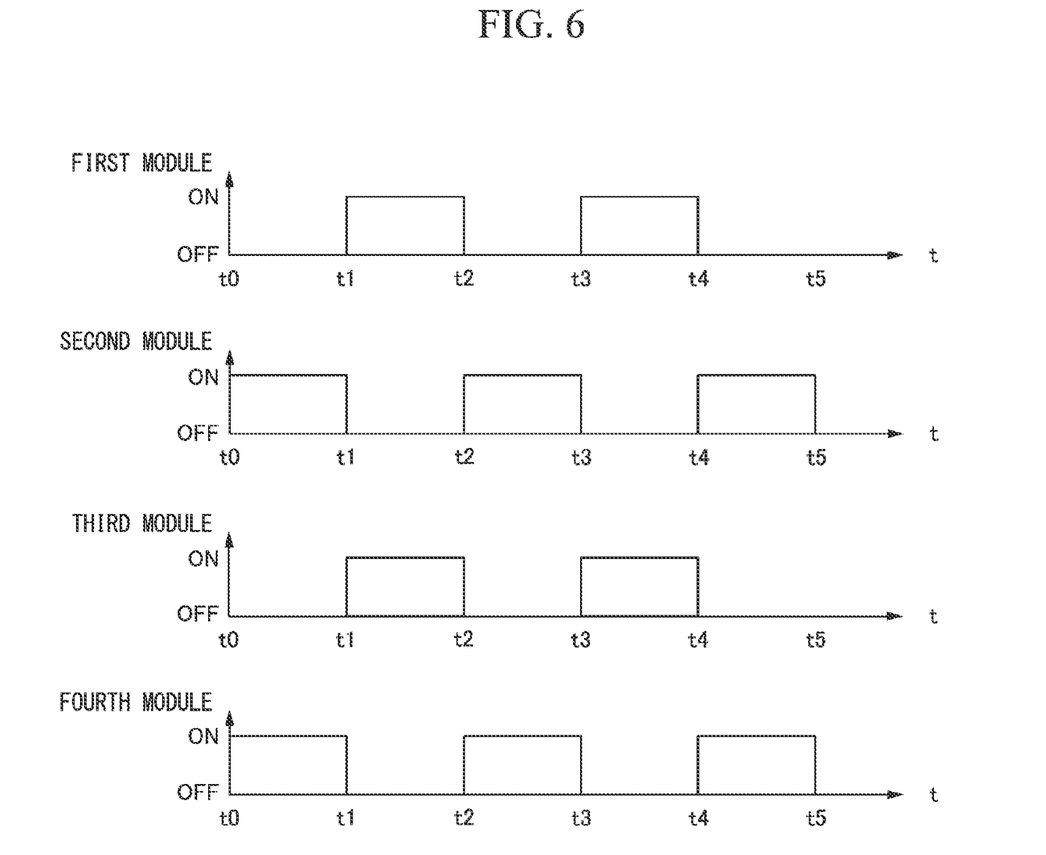
FIG. 6 is a diagram showing a second example of the on/off pattern of the opening/closing circuit corresponding to each of the first to fourth modules in the charging system in the embodiment of the present invention.
Figure 7:
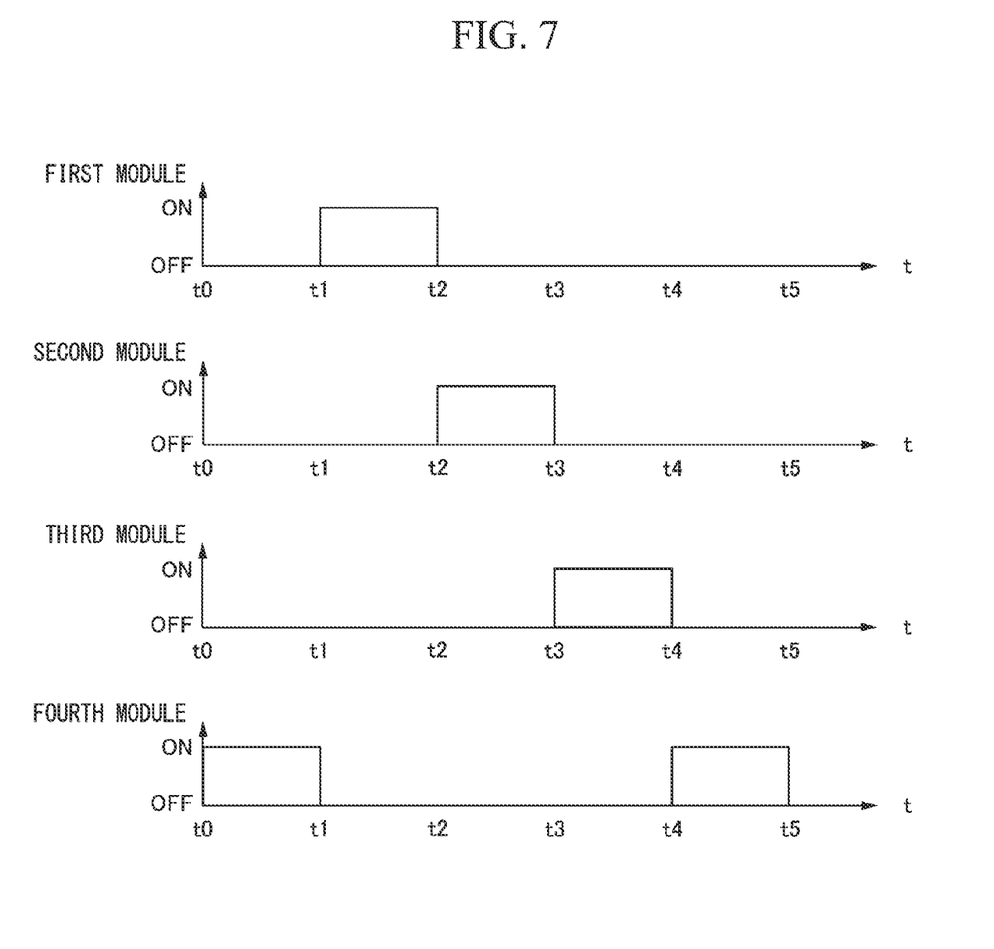
FIG. 7 is a diagram showing a third example of the on/off pattern of the opening/closing circuit corresponding to each of the first to fourth modules in the charging system in the embodiment of the present invention.

FIG. 4 is a diagram showing an example of a correspondence relationship between an output voltage of the AC power source 11, charging electric power of the battery 1, and the number of the modules 4 corresponding to the opening/closing rectifying unit 14 in a connection state in the charging system 10 in the embodiment. FIG. 5 is a diagram showing a first example of an on/off pattern of the opening/closing circuit 41 corresponding to each of the first to fourth modules 4a, 4b, 4c, and 4d in the charging system 10 in the embodiment. FIG. 6 is a diagram showing a second example of the on/off pattern of the opening/closing circuit 41 corresponding to each of the first to fourth modules 4a, 4b, 4c, and 4d in the charging system 10 in the embodiment. FIG. 7 is a diagram showing a third example of the on/off pattern of the opening/closing circuit 41 corresponding to each of the first to fourth modules 4a, 4b, 4c, and 4d in the charging system 10 in the embodiment.

The control device 15 sets, for example, the upper limit number of modules 4 of the plurality of modules 4 in which charging is performed at the same time, that is, the upper limit number of opening/closing rectifying units 14 in which a connection state is provided at the same time in accordance with the output voltage of the AC power source 11. The control device 15 sequentially switches and selects the upper limit number of opening/closing rectifying units 14 from among the plurality of opening/closing rectifying units 14 in which a connection state is provided at the same time.

For example, as shown in FIG. 4, as an output voltage Vac of the AC power source 11 increases, charging electric power PM for the battery 1 changes in an increasing tendency. As the number of modules 4 (the number of on-modules) of the plurality of modules 4 in which charging is performed at the same time increases, the charging electric power PM for the battery 1 changes in an increasing tendency. For example, when the output voltage Vac of the AC power source 11 decreases, the control device 15 reduces the charging electric power for the battery 1 by reducing the number of modules 4 (the number of on-modules) in which charging is performed at the same time.

For example, in the four modules 4, the upper limit number is 3 in the first example shown in FIG. 5, the upper limit number is 2 in the second example shown in FIG. 6, and the upper limit number is 1 in the third example shown in FIG. 7. In each of the first example, the second example, and the third example, the modules 4 having the upper limit number in which a connection state is provided are sequentially switched from among the plurality of modules 4 between times after time t0 (for example, between time t0 and time t1, between time t1 and time t2, between time t2 and time t3, between time t3 and time t4, and the like).

As described above, the charging system 10 in the embodiment controls charging of the plurality of modules 4 in accordance with the state quantity of at least one of the output voltage of the AC power source 11 and the input voltage of the rectifying circuit 42 or the state quantity associated with at least one of the output voltage and the input voltage. Thus, even when the output voltage of the AC power source 11 is restricted, it is possible to minimize a decrease in charging efficiency. For example, even when the output voltage of the AC power source 11 is restricted and the output voltage cannot be lowered below a prescribed voltage, it is possible to minimize the total amount of charging electric power supplied to the plurality of modules 4. Since the total amount of charging electric power supplied to the plurality of modules 4 can be minimized without lowering the output voltage of the AC power source 11, it is possible to prevent an operation in the region in which the efficiency of electric power conversion for stepping up or stepping down the output voltage of the AC power source 11 is low and it is possible to minimize a conversion loss.

Figure 8:
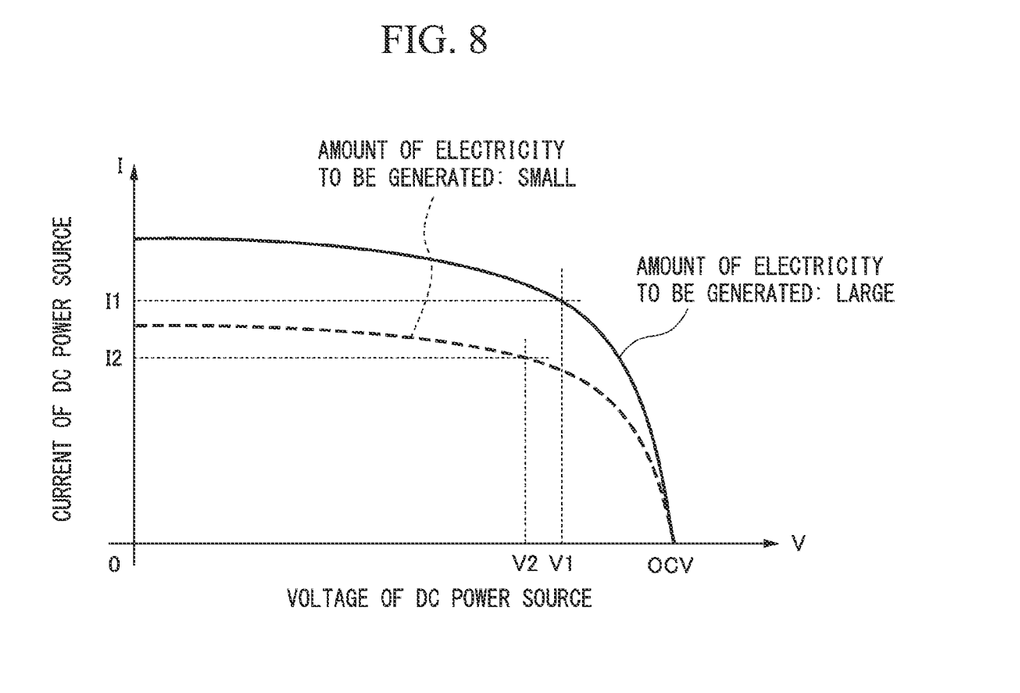
FIG. 8 is a diagram showing an example of a correspondence relationship between a voltage and a current of a direct current (DC) power source and an amount of electricity to be generated in the charging system in the embodiment of the present invention.
Figure 9:
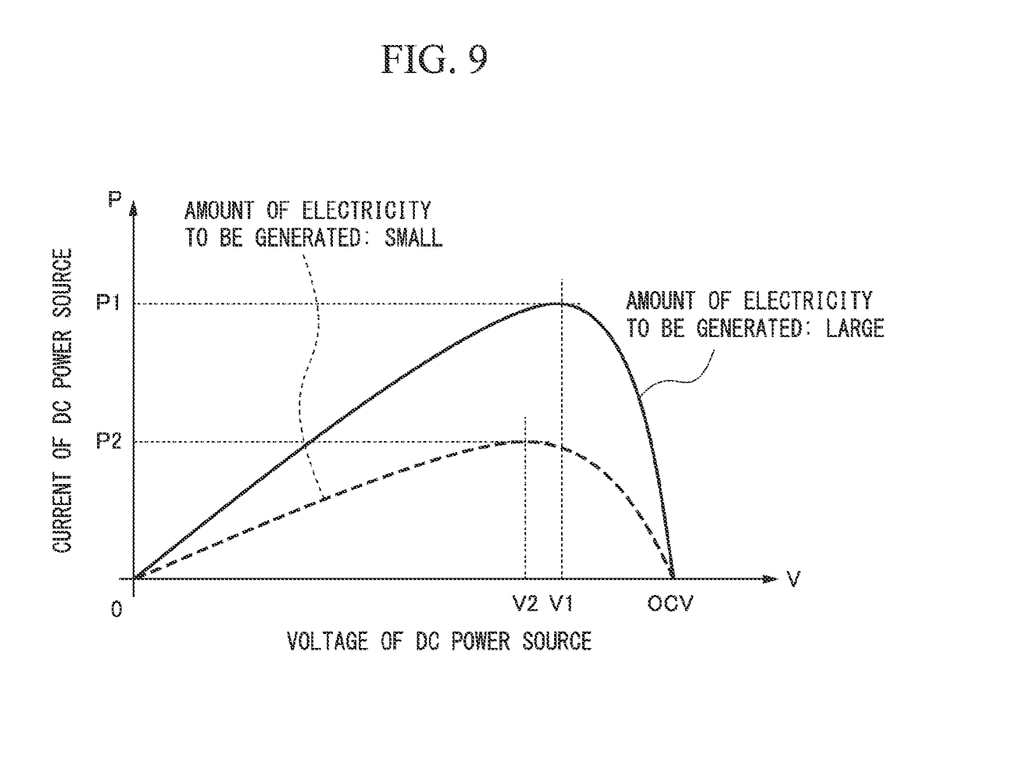
FIG. 9 is a diagram showing an example of a correspondence relationship between a voltage and electric power of the DC power source and an amount of electricity to be generated in the charging system in the embodiment of the present invention.

FIG. 8 is a diagram showing an example of a correspondence relationship between a voltage and a current of DC power source 21 and an amount of electricity to be generated in the charging system 10 in the embodiment. FIG. 9 is a diagram showing an example of a correspondence relationship between a voltage and electric power of the DC power source 21 and an amount of electricity to be generated in the charging system 10 in the embodiment.

For example, as a voltage increases in the DC power source 21 which is a solar cell or the like as shown in FIGS. 8 and 9, a current changes in a decreasing tendency. Along with this, the electric power of the DC power source 21 is maximized at a prescribed voltage smaller than an open circuit voltage OCV. For example, in the case of a solar cell, an amount of electricity to be generated changes in accordance with an amount of solar radiation, and thus when the amount of electricity to be generated is relatively large, maximum electric power P1 is provided at a prescribed voltage V1, whereas when the amount of electricity to be generated is relatively small, maximum electric power P2 (<P1) smaller than the maximum electric power P1 is provided at a prescribed voltage V2 (<V1) smaller than the prescribed voltage V1.

Incidentally, for example, when stepping-up or stepping-down is performed on the plurality of modules 4 connected to the plurality of rectifying circuits 42 composed of the plurality of diodes which are bridge-connected using the first power conversion unit 22 to secure desired charging electric power using maximum electric power of the DC power source 21 in which an amount of electricity to be generated changes in accordance with an amount of solar radiation, there is a concern concerning a decrease in charging efficiency in the entire system due to a decrease in conversion efficiency. On the other hand, when the number of charge receptions from the plurality of modules 4 is changed in accordance with a power generation state of the DC power source 21 without changing an operation point of the first power conversion unit 22, it is possible to minimize a decrease in charging efficiency of the entire system.

For example, when the number of charge receptions of the plurality of modules 4 is changed so that voltage stepping-up/down conversion of the first power conversion unit 22 decreases with respect to a voltage at a maximum electric power operation point of the DC power source 21, it is possible to improve efficiency.

The control device 15 can uniformly charge the plurality of modules 4 while minimizing a decrease in charging efficiency by partially stopping charging of the plurality of modules 4 of the battery 1 and sequentially switching the modules 4 of which charging stops and maintain a uniform charging state between the modules 4.

The control device 15 can control a time of a connection state using a connection time, a connection frequency, or the like of each opening/closing circuit 41 to easily correct a difference in charging state even when a difference in charging state occurs between the plurality of modules 4.

Modified Example

A modified example of the embodiment will be described below. Constituent elements in the modified example that are the same as those of the above-described embodiment will be denoted by the same reference numerals and description thereof will be omitted or simplified.

First Modified Example

In the above-described embodiment, the AC electric circuit 12 may include a transformer between AC power sources 11.

Figure 10:
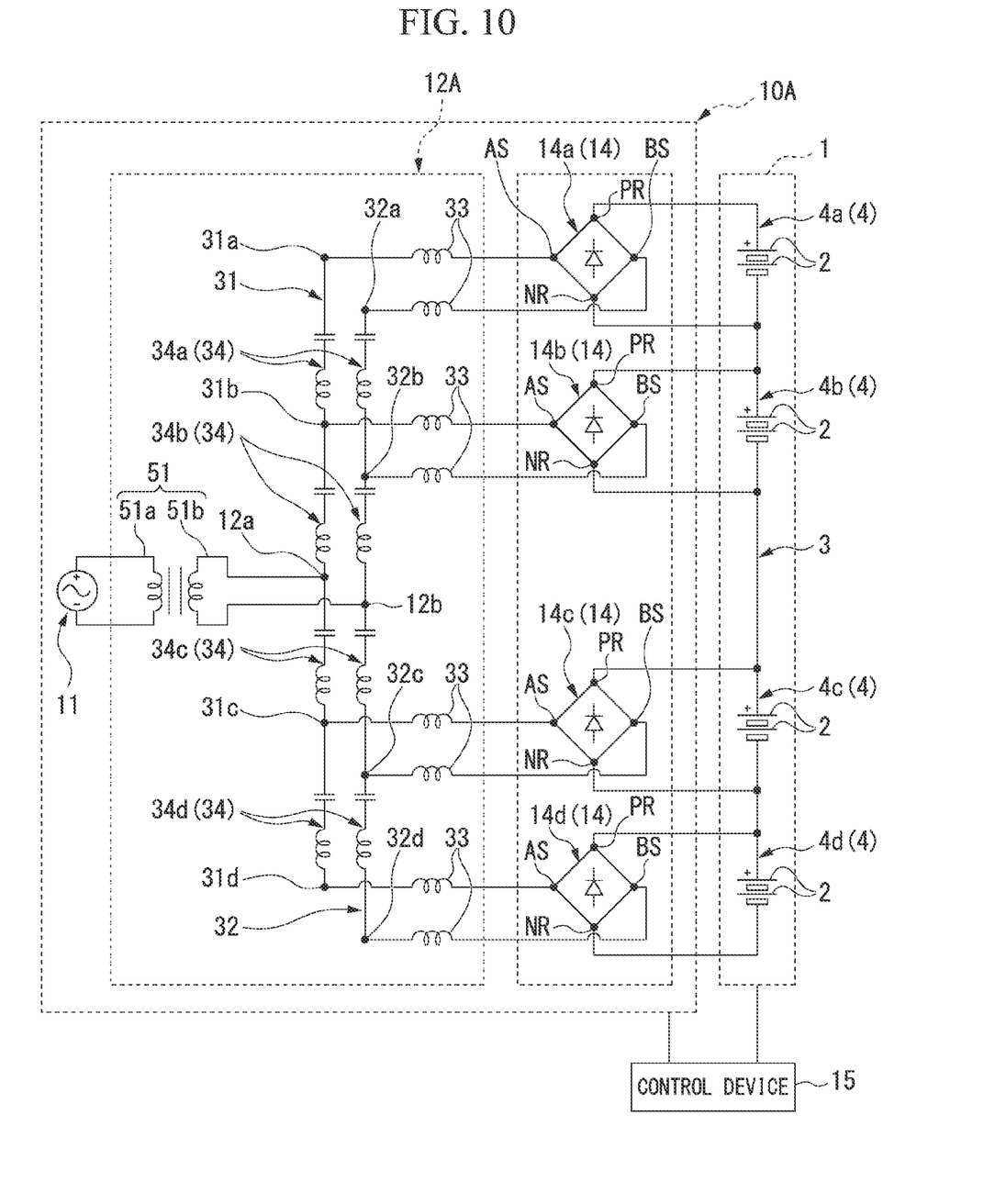
FIG. 10 is a diagram showing a constitution of a charging system in a first modified example of the embodiment of the present invention.

FIG. 10 is a diagram showing a constitution of a charging system 10A in a first modified example of the embodiment.

As shown in FIG. 10, an AC electric circuit 12A of the charging system 10A in the first modified example includes a transformer 51 connected to the AC power sources 11. The transformer 51 includes, for example, a primary winding 51a and a secondary winding 51b which are magnetically joined. Both ends of the primary winding 51a are connected to an A-phase terminal AT and a B-phase terminal BT of each of the AC power sources 11. Both ends of the secondary winding 51b are connected to an A-phase terminal 12a and a B-phase terminal 12b of the AC electric circuit 12A. The transformer 51 transforms the AC electric power output from the AC power source 11 in accordance with a turn ratio of the primary winding 51a and the secondary winding 51b and applies the transformed AC electric power to the A-phase terminal 12a and the B-phase terminal 12b.

Second Modified Example

In the above-described embodiment, a battery 1 may include a switch for switching connection and disconnection at an intermediate position or the like of a plurality of cells 2 connected in series.

Figure 11:
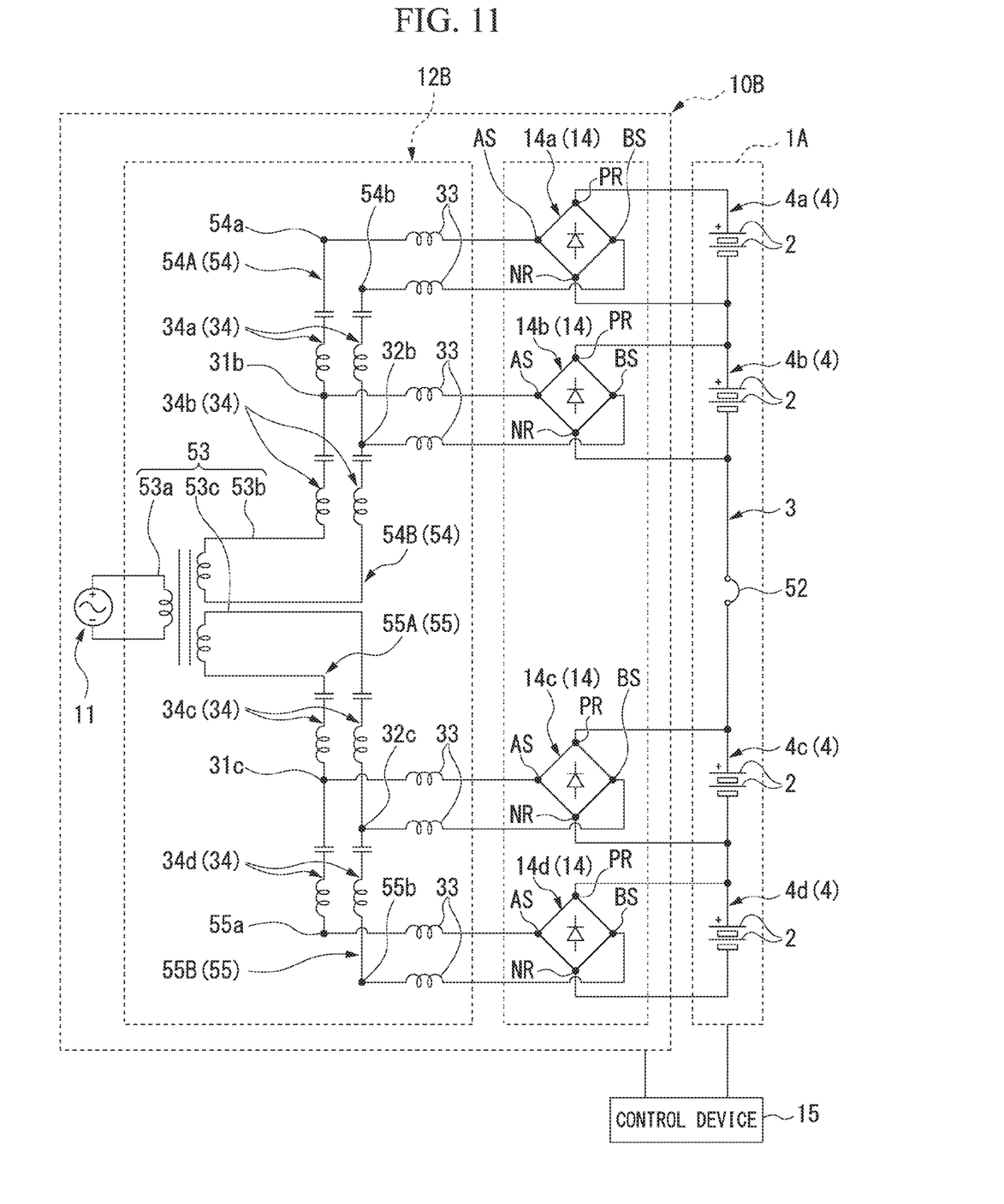
FIG. 11 is a diagram showing a constitution of a charging system in a second modified example of the embodiment of the present invention.

FIG. 11 is a diagram showing a constitution of a charging system 10B in a second modified example of the embodiment.

As shown in FIG. 11, a battery 1A in the second modified example includes, for example, a switch 52 which mechanically switches connection and disconnection manually by a manipulator or the like at an intermediate position of a plurality of cells 2 connected in series, that is, between a second module 4b and a third module 4c.

An AC electric circuit 12B of the charging system 10B in the second modified example includes a transformer 53 connected to an AC power source 11. The transformer 53 includes, for example, the primary winding 53a and the first and second secondary windings 53b and 53c which are magnetically joined primary winding 53a and first and second secondary windings 53b and 53c. Both ends of the primary winding 53a are connected to the A-phase terminal AT and the B-phase terminal BT of the AC power source 11. Both ends of the first secondary winding 53b are connected to a first AC electric circuit 54. Both ends of the second secondary winding 53c are connected to a second AC electric circuit 55. The transformer 53 transforms AC electric power output from the AC power source 11 in accordance with a turn ratio of the primary winding 53a and each of the first secondary winding 53b and the second secondary winding 53c and applies the transformed AC electric power to the first AC electric circuit 54 and the second AC electric circuit 55.

The first AC electric circuit 54 and the second AC electric circuit 55 are formed by dividing the AC electric circuit 12 in the above-described embodiment into two circuits at the A-phase terminal 12a and the B-phase terminal 12b.

The first AC electric circuit 54 includes an A-phase electric circuit 54A, a B-phase electric circuit 54B, and two pairs of inductors 33. Each of the A-phase electric circuit 54A and the B-phase electric circuit 54B includes a first LC row 34a and a second LC row 34b which are connected in series. The A-phase electric circuit 54A and the B-phase electric circuit 54B are connected to both ends of the first secondary winding 53b. The two pairs of inductors 33 are connected between the A-phase electric circuit 54A and the B-phase electric circuit 54B and a first opening/closing rectifying unit 14a and a second opening/closing rectifying unit 14b.

Ends 54a and 54b of the A-phase electric circuit 54A and the B-phase electric circuit 54B connected to both ends of the first secondary winding 53b are connected to an A-phase terminal AS and A B-phase terminal BS of the first opening/closing rectifying unit 14a via a pair of inductors 33 of the inductors 33.

A connection point 31b of the A-phase electric circuit 54A between a first LC row 34a and a second LC row 34b is connected to the A-phase terminal AS of the second opening/closing rectifying unit 14b via one of the inductors 33. A connection point 32b of the B-phase electric circuit MB between the first LC row 34a and the second LC row 34b is connected to the B-phase terminal BS of the second opening/closing rectifying unit 14b via one of the inductors 33.

The second AC electric circuit 55 includes an A-phase electric circuit 55A, a B-phase electric circuit 55B, and two pairs of inductors 33. Each of the A-phase electric circuit 55A and the B-phase electric circuit 55B includes a third LC row 34c and a fourth LC row 34d which are connected in series. The A-phase electric circuit 55A and the B-phase electric circuit 55B are connected to both ends of the second secondary winding 53c. The two pairs of inductors 33 are connected between the A-phase electric circuit 55A and the B-phase electric circuit 55B and the third opening/closing rectifying unit 14c and the fourth opening/closing rectifying unit 14d.

Ends 55a and 55b of the A-phase electric circuit 55A and the B-phase electric circuit 55B connected to both ends of the second secondary winding 53c are connected to the A-phase terminal AS and the B-phase terminal BS of the fourth opening/closing rectifying unit 14d via a pair of inductors 33 of the inductors 33.

A connection point 31c of the A-phase electric circuit 55A between the third LC row 34c and the fourth LC row 34d is connected to the A-phase terminal AS of the third opening/closing rectifying unit 14c via one of the inductors 33. A connection point 32b of the B-phase electric circuit 55B between the third LC row 34c and the fourth LC row 34d is connected to the B-phase terminal BS of the third opening/closing rectifying unit 14c via one of the inductors 33.

Third Modified Example

Although the opening/closing rectifying unit 14 includes the rectifying circuit 42 which is a full-wave rectifying circuit in the above-described embodiment, the present invention is not limited thereto and may include another rectifying circuit.

Figure 12:
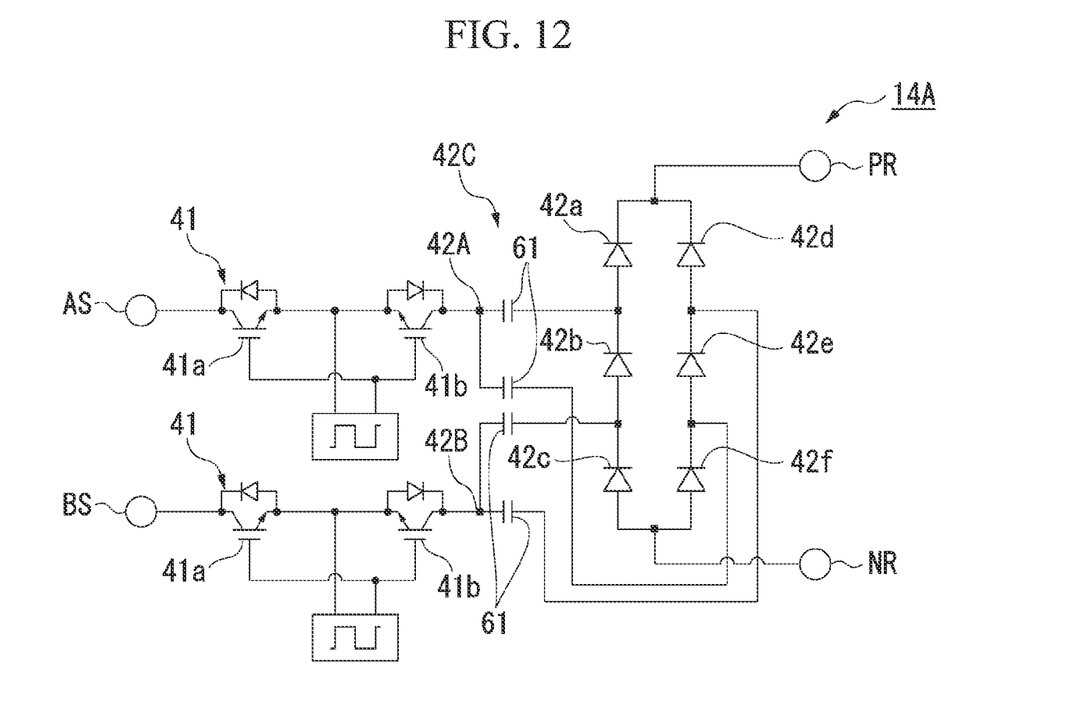
FIG. 12 is a diagram showing a constitution of a rectifying circuit and an opening/closing circuit of a charging system in a third modified example of the embodiment of the present invention.

FIG. 12 is a diagram showing a constitution of a rectifying circuit 42C and an opening/closing circuit 41 of an opening/closing rectifying unit 14A in a third modified example of the embodiment.

As shown in FIG. 12, the opening/closing rectifying unit 14A in the third modified example includes an opening/closing circuit 41 and a rectifying circuit 42C. The rectifying circuit 42C is, for example, a voltage doubler rectifying circuit. The rectifying circuit 42C includes a first diode 42a, a second diode 42b, and a third diode 42c which are connected in the forward direction in a first row, a fourth diode 42d, a fifth diode 42e, and a sixth diode 42f which are connected in the forward direction in a second row, and four capacitors 61.

Each of an anode of the first diode 42a and a cathode of the second diode 42b and an anode of the fifth diode 42e and a cathode of the sixth diode 42f is connected to a first AC terminal 42A via one capacitor 61.

Each of an anode of the second diode 42b and a cathode of the third diode 42c and an anode of the fourth diode 42d and a cathode of the fifth diode 42e is connected to a second AC terminal 42B via one capacitor 61.

Each of the cathodes of the first diode 42a and the fourth diode 42d is connected to a positive electrode terminal PR. Each of the anodes of the third diode 42c and the sixth diode 42f is connected to a negative electrode terminal NR. The positive electrode terminal PR and the negative electrode terminal NR of the rectifying circuit 42C are connected to a positive electrode end and a negative electrode end of a corresponding module 4 in a battery 1.

The rectifying circuit 42C rectifies AC electric power input from the first AC terminal 42A and the second AC terminal 42B, steps up a voltage amplitude of the rectified DC electric power to twice a voltage amplitude of AC electric power, and outputs the stepped-up voltage amplitude from the positive electrode terminal PR and the negative electrode terminal NR.

Fourth Modified Example and Fifth Modified Example

Although the two opening/closing circuits 41 are connected between the A-phase terminal AS and the B-phase terminal BS of the opening/closing rectifying unit 14 or 14A and the rectifying circuit 42 or 42A in the embodiment and the third modified example described above, the present invention is not limited thereto. Two opening/closing circuits 41 may be connected between the positive electrode terminal PR and the negative electrode terminal NR of the opening/closing rectifying unit 14 or 14A and the rectifying circuit 42 or 42A.

Figure 13:
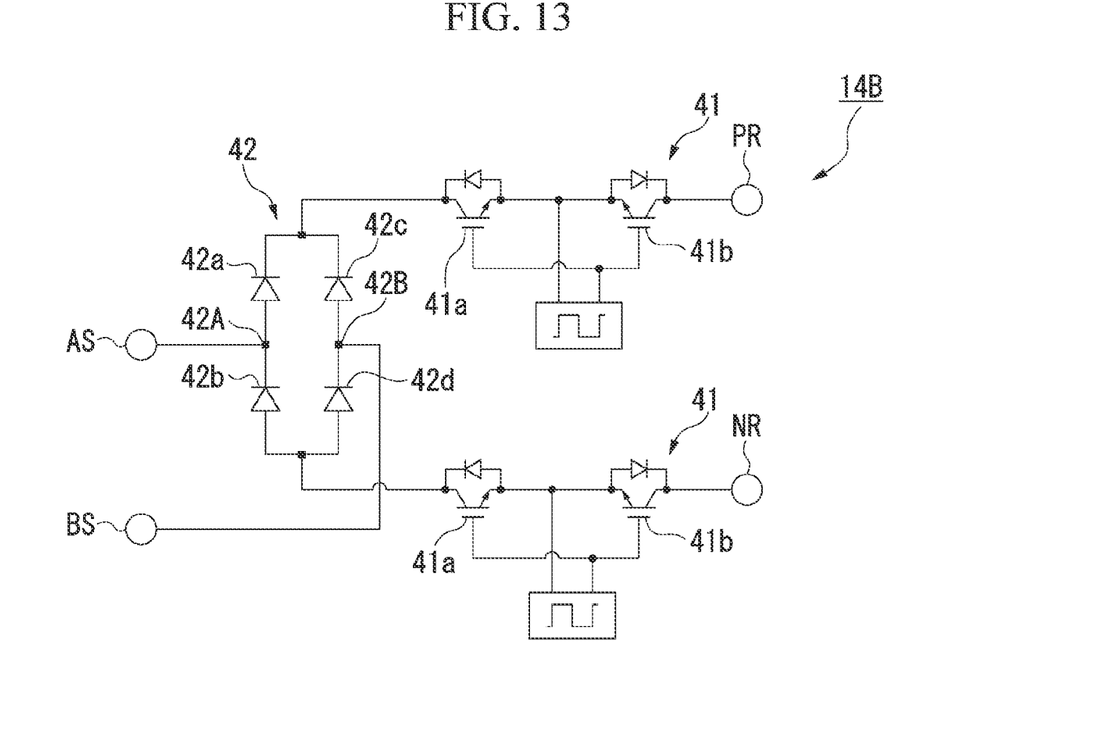
FIG. 13 is a diagram showing a constitution of a rectifying circuit and an opening/closing circuit of a charging system in a fourth modified example of the embodiment of the present invention.
Figure 14:
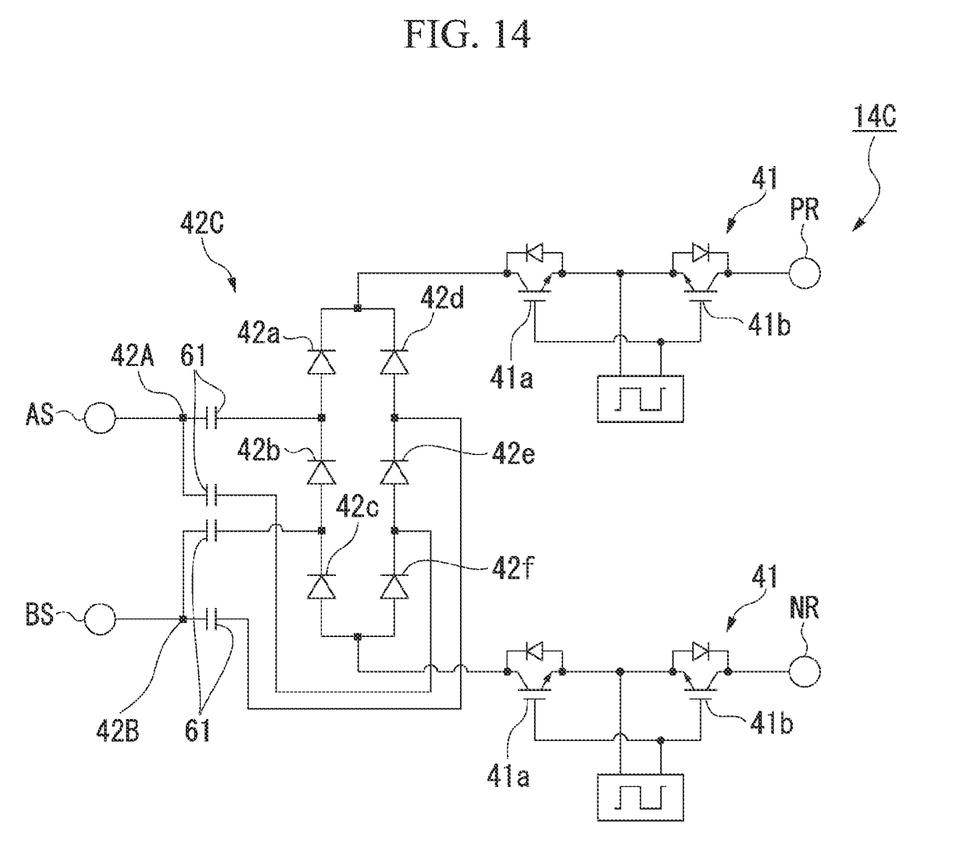
FIG. 14 is a diagram showing a constitution of a rectifying circuit and an opening/closing circuit in a fifth modified example of the embodiment of the present invention.

FIG. 13 is a diagram showing a constitution of a rectifying circuit 42 and an opening/closing circuit 41 of an opening/closing rectifying unit 14B in a fourth modified example of the embodiment. FIG. 14 is a diagram showing a constitution of a rectifying circuit 42C and an opening/closing circuit 41 of an opening/closing rectifying unit 14C in a fifth modified example of the embodiment.

As shown in FIGS. 13 and 14, each of the opening/closing rectifying unit 14B in the fourth modified example and the opening/closing rectifying unit 14C in the fifth modified example includes two opening/closing circuits 41 which are disposed on a battery 1 side of a rectifying circuit 42 or 42A and connected to the positive electrode terminal PR and the negative electrode terminal NR. A collector of a first transistor 41a of each of the opening/closing circuits 41 is connected to a positive electrode end (or a negative electrode end) of the rectifying circuit 42 or 42A. A collector of a second transistor 41b is connected to the positive electrode terminal PR (or the negative electrode terminal NR).

Although the first power conversion unit 22 performs two electric power conversions such as stepping-up and stepping-down in the above-described embodiment, the present invention is not limited thereto and may include a stepping-up circuit or a stepping-down circuit.

Although the charging system 10 is installed in the vehicle in the above-described embodiment, the present invention is not limited thereto and the charging system 10 may be installed in other devices.

The embodiments of the present invention are presented as examples and are not intended to limit the scope of the invention. These embodiments can be implemented in various other forms and various omissions, replacements, and changes are possible without departing from the gist of the invention. These embodiments and modifications thereof are included in the scope and the gist of the invention as well as in the scope of the invention described in the claims and the equivalent scope thereof.

What is claimed is:

1. A charging system which charges a power storage device formed by connecting a plurality of power storage elements with electricity, comprising:
   an alternating current (AC) power source;
   a plurality of rectifying units which are connected to a plurality of modules formed by dividing the power storage device into the plurality of modules and supply direct current (DC) electric power obtained by rectifying AC electric power supplied from the AC power source to the plurality of modules;
   a plurality of opening/closing units which switch between connection and disconnection between the AC power source and each of the plurality of modules; and
   a control device which controls connection and disconnection of the plurality of opening/closing units in accordance with a state quantity of at least one of an output voltage of the AC power source and an input voltage of the rectifying units or a state quantity associated with at least one of the output voltage and the input voltage,
   wherein the control device sets an upper limit number of the opening/closing units to be connected at the same time among the plurality of opening/closing units in accordance with the state quantity and sequentially switches and selects the upper limit number of the opening/closing units to be connected from among the plurality of opening/closing units.

2. The charging system according to claim 1, wherein the control device controls a time of each connection state of the plurality of opening/closing units so that a charging state of each of the plurality of modules is the same.

* * * * *